(12) United States Patent
Powell

(10) Patent No.: US 8,035,527 B2
(45) Date of Patent: Oct. 11, 2011

(54) FIRE DETECTION

(75) Inventor: Brian David Powell, Maidenhead (GB)

(73) Assignee: Kidde IP Holdings Limited, Slough, Berkshire (GB)

(*) Notice: Subject to any disclaimer, the term of this patent is extended or adjusted under 35 U.S.C. 154(b) by 567 days.

(21) Appl. No.: 12/066,166

(22) PCT Filed: Jul. 14, 2006

(86) PCT No.: PCT/GB2006/002611
§ 371 (c)(1),
(2), (4) Date: Sep. 16, 2008

(87) PCT Pub. No.: WO2007/028939
PCT Pub. Date: Mar. 15, 2007

(65) Prior Publication Data
US 2009/0072981 A1    Mar. 19, 2009

(30) Foreign Application Priority Data
Sep. 9, 2005 (GB) .................................. 0518457.7

(51) Int. Cl.
*G08B 17/10* (2006.01)
(52) U.S. Cl. ............... 340/628; 340/691.6; 340/588; 340/606
(58) Field of Classification Search .............. 340/628, 340/626–627, 629–635, 636.18, 691.6, 588, 340/601–602, 606
See application file for complete search history.

(56) References Cited

U.S. PATENT DOCUMENTS

| | | | |
|---|---|---|---|
| 4,761,073 A * | 8/1988 | Meltz et al. ........... | 356/32 |
| 4,839,527 A * | 6/1989 | Leitch ................ | 250/573 |
| 5,513,913 A * | 5/1996 | Ball et al. ............ | 374/120 |

(Continued)

FOREIGN PATENT DOCUMENTS

CA    2 538 881 A1    5/2005

(Continued)

OTHER PUBLICATIONS

UK Search Report for priority application GB 0518457.7.

*Primary Examiner* — Daniel Previl

(74) *Attorney, Agent, or Firm* — Kinney & Lange, P.A.

(57) ABSTRACT

A fire detection system for monitoring a volume containing fluid, typically air, for the presence of smoke particles is disclosed. A conduit for receiving the fluid, and any smoke particles therein, and directing the fluid to a smoke detector has a plurality of inlets formed therein. A respective temperature sensor is associated with each of the inlets which generate a signal indicative of a change in temperature in the region of the inlet. In the embodiments, the temperature sensor comprises one or more fiber Bragg gratings. The fiber Bragg gratings preferably have different grating periods. The reflected light from each fiber Bragg grating is returned back down the fiber optic cable and redirected via a 2×1 coupler to a wavelength detection system and a personal computer. The combination of wavelength detection system and personal computer allow analysis of the reflected light patterns, as well as providing a user interface which enables detection of the occurrence of a spatial and/or a temperature variation. The location of the said variation along the fiber optic cable is advantageously detectable. The system described is highly sensitive to smoke, but can advantageously also provide an indication of the location of the smoke source, because any variation in temperature at any one of the smoke inlets is also detected, the location of the sensor being known.

29 Claims, 6 Drawing Sheets

U.S. PATENT DOCUMENTS

| | | | | |
|---|---|---|---|---|
| 5,909,273 | A | * | 6/1999 | Malvern .................. 356/35.5 |
| 6,078,040 | A | * | 6/2000 | Endo et al. ............... 250/222.2 |
| 7,421,162 | B2 | * | 9/2008 | McCarthy et al. ........... 385/37 |
| 7,551,277 | B2 | * | 6/2009 | Cole ........................ 356/335 |
| 2004/0145484 | A1 | | 7/2004 | Wagner et al. |
| 2004/0246137 | A1 | * | 12/2004 | Bobenhausen ............ 340/606 |

FOREIGN PATENT DOCUMENTS

| | | |
|---|---|---|
| DE | 103 48 565 A1 | 5/2005 |
| EP | 1 524 509 A1 | 4/2005 |
| GB | 2 367 358 A | 4/2002 |
| JP | 2000-123265 | 4/2000 |

* cited by examiner

FIRE DETECTION

TECHNICAL FIELD

This invention relates to a fire detection system and method.

BACKGROUND ART

Smoke detection systems are known that include a network of pipes with gas inlet ports/sampling points located at intervals around the network. Gas, and smoke particles, if present, enter into the network via the inlets, are drawn along the pipes, and can be detected by a suitable detector. For example, the HART High Sensitivity Smoke Detection system available from Kidde Plc is one such system, and comprises a laser-based aspirating detector which counts particles of smoke to reliably detect fire at its very earliest stages. A fan draws gas, and smoke particles if present, through the pipe network into the detector. A disadvantage of such smoke detection systems is that the location of the inlet through which the smoke particles were drawn cannot be readily determined, so the likely location of the fire cannot be indicated.

The use of fibre Bragg gratings in sensors is well known. U.S. Pat. No. 4,761,073 (incorporated herein by reference) describes a spatially resolving fibre optic cable strain gauge which utilises fibre Bragg gratings, and it is also known to use similar fibre Bragg grating sensors to monitor variations in temperature. Variations are able to be sensed as the period and the effective refractive index of a fibre Bragg grating are altered as a result of a change in strain or a change in the ambient temperature in the locality of the fibre Bragg grating.

Fibre Bragg gratings are formed in photosensitive fibre optic cables by creating a periodic variation in the refractive index of the core of the fibre optic cable, which acts as a grating to reflect incident light. The wavelength of this reflected light, known as the Bragg wavelength $\lambda_B$, is dependent on the grating period and the effective refractive index of the fibre Bragg grating, according to the equation $$\lambda_B = 2n_{eff}\Lambda,$$

where $n_{eff}$ is the effective refractive index of the fibre optic cable and $\Lambda$ is the period of the fibre Bragg grating.

This Bragg wavelength is known to be affected as a consequence of localised spatial and/or temperature variations in the vicinity of the fibre Bragg grating. Fibre Bragg gratings have predictable, well defined responses to spatial and/or temperature variations. These responses are known to be approximately linear at and above room temperature, and fibre Bragg grating sensors operate by measuring the wavelength shift of the Bragg wavelength in response to the aforementioned spatial and/or temperature variations.

The Bragg wavelength shift $\Delta\lambda_B$ in response to spatial and/or temperature variations in the fibre optic cable in the vicinity of the fibre Bragg grating is brought about by a change in the grating period, and is found by differentiating the above equation to account for changes in the length of the fibre optic cable and/or the temperature in the vicinity of the fibre Bragg grating. This results in $$\Delta\lambda_B = 2\left(\Lambda\frac{\partial n_{eff}}{\partial l} + n_{eff}\frac{\partial \Lambda}{\partial l}\right) + 2\left(\Lambda\frac{\partial n_{eff}}{\partial T} + n_{eff}\frac{\partial \Lambda}{\partial T}\right).$$

There are currently two approaches to making sensors using fibre Bragg grating technology. The simplest approach is to write a plurality of identical fibre Bragg gratings (i.e. gratings with the same grating pitch) along the length of a fibre optic cable. Incident light is reflected by each of these fibre Bragg gratings, the Bragg wavelength of each reflection being the same due to the equality of the fibre Bragg gratings. Spatial and/or temperature variations in the locality of the fibre optic cable would result in a shift of the Bragg wavelength of the light reflected by one or more affected fibre Bragg gratings. This change can be sensed, and hence it is possible to detect that a spatial and/or temperature variation has occurred.

The approximate position of the spatial and/or temperature variations can be obtained by optical time domain reflectometry. In this technique, a very short pulse of light (of the order of 1 ns) is injected into the fibre optic cable and the reflected spectrum measured as a function of time after the pulse injection. This approach is limited in that, although spatial and/or temperature variations in the locality of the fibre optic cable are detectable, there is no provision for the precise location of such variations, given that the resolution of the position information is practically only of the order of a few meters, meaning that only fibre Bragg gratings that are several meters apart can be distinguished.

An alternative approach is to write a plurality of fibre Bragg gratings along the length of a fibre optic cable, each fibre Bragg grating having a unique grating pitch. Incident light is reflected by each of these fibre Bragg gratings, the Bragg wavelength of each reflection in this case being characteristic of a particular fibre Bragg grating. Spatial and/or temperature variations occurring in a particular vicinity will affect one or more of the fibre Bragg gratings in that vicinity, leading to a shift of the Bragg wavelength of the light reflected by the affected fibre Bragg grating or gratings. Analysis of the reflected light patterns therefore enables detection of the occurrence of a spatial and/or a temperature variation. The location of the variation along the fibre optic cable is also detectable by determining from which particular fibre Bragg grating or fibre Bragg gratings the shifted Bragg wavelength emanates.

However, the Bragg wavelengths of the fibre Bragg gratings must in this case be sufficiently far apart so that the shift in the Bragg wavelength over the operating range of any grating does not overlap the different Bragg wavelength associated with another fibre Bragg grating. This provides a restriction on the number of fibre Bragg gratings that can be interrogated with one sensor and/or the temperature variation that can be sensed.

A fibre Bragg grating fire detection system is described in EP-A-1 524 509 ("FBG Alarm"). Such a fibre Bragg grating fire detection system is sensitive to variations in temperature. The smoke detector arrangements described above are sensitive only to the generation of smoke particles. Some types of fire will initially or primarily generate smoke with little heat, and some types of fire will initially or primarily generate heat with little smoke. It would be advantageous to provide a fire detection system that could detect rapidly a fire which initially or primarily produced heat or smoke. Further, it would be advantageous to provide a smoke detection system that could provide an indication of the location of the source of the smoke particles.

SUMMARY OF THE INVENTION

According to the first aspect of the invention, there is provided a fire detection system for monitoring a volume containing fluid, the system including a conduit having a plurality of inlets for receiving the fluid and for directing the received fluid, and any smoke particles therein, to a smoke detector; and a respective sensor associated with each of said inlets for generating a signal indicative of any sensed change in the region of the inlet.

The sensors may generate a signal indicative of the expansion or compression (spatial variation) of the sensor. For example, that expansion or compression (spatial variation) may be due to a change in temperature. The sensors may each comprise at least one fibre Bragg grating. These fibre Bragg gratings may be sensitive to temperature variations in the known way, or may alternatively be responsive to the presence of a predetermined gas.

The fibre Bragg gratings may be formed in a single fibre optic cable. The fibre optic cable in the embodiment extends along the conduit and is arranged to extend from each inlet into the volume.

In the embodiment, when the sensors are fibre Bragg gratings, the signals generated by the sensors are optical signals.

According to the second aspect of the invention, there is provided a fire detection system for monitoring a volume containing fluid, the system including a conduit having a plurality of inlets for receiving the fluid and for directing the received fluid, and any smoke particles therein, to a smoke detector; at least one fibre Bragg grating associated with each of said inlets for generating a signal when the fibre Bragg grating expands or contracts.

According to a further aspect of the invention, there is provided a fire detection method including monitoring a volume containing fluid using a conduit having a plurality of inlets for receiving the fluid and for directing the received fluid, and any smoke particles therein, to a smoke detector; wherein a respective sensor is associated with each of said inlets for generating a signal indicative of any sensed change in the region of the inlet.

There may be provided a reference fibre Bragg grating, which is maintained at a known temperature. This reference fibre Bragg grating is monitored to allow correction for drifting in the sensory equipment. It is possible to include more than one reference fibre Bragg grating covering a range of wavelengths to maintain the precision of measurement across the full wavelength range.

BRIEF DESCRIPTION OF THE DRAWINGS

For a better understanding of the present invention, a fire detection system and method according to the present invention and embodying the present invention will now be described by way of example, with reference to the accompanying drawings in which:—

FIG. 1A shows a plan view of the sampling nozzle of FIG. 1 in more detail;

In the drawings, like elements are generally designated with the same reference numeral.

DETAILED DESCRIPTION OF EMBODIMENTS OF THE INVENTION

Figure 1:
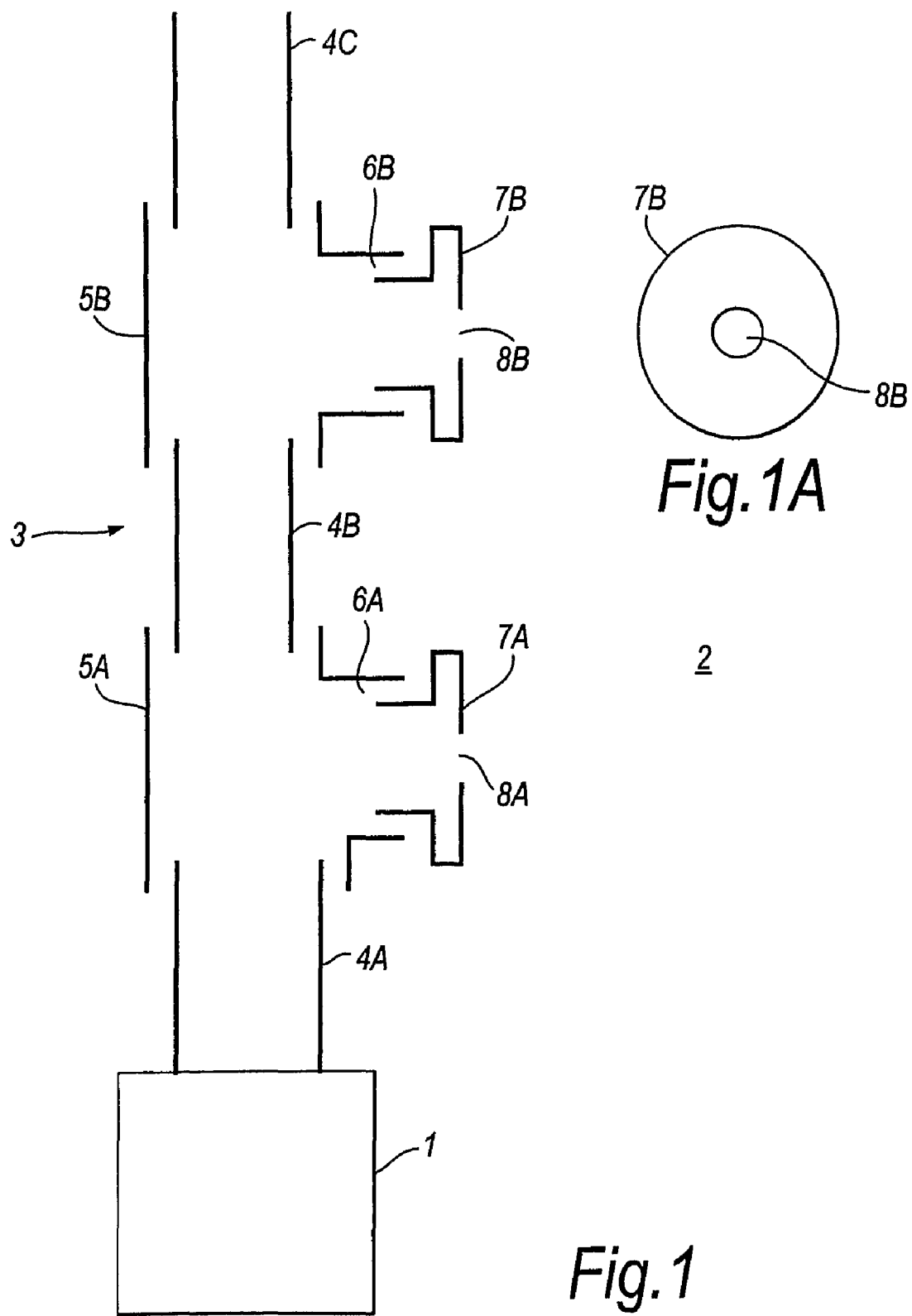
FIG. 1 shows a schematic cross-sectional view of a smoke detection system of a generally known type.

The smoke detection system of a generally known type shown in FIG. 1 comprises a smoke detector 1. For example, the smoke detector 1 may be a HART High Sensitivity Smoke Detection system available from Kidde Plc, which uses laser based technology to count particles of smoke in a gas for detecting a fire. The smoke detector 1 provides fire detection for a volume 2 containing air (although this could be some other fluid). A conduit 3 receives air from the volume 2. Typically, the volume 2 will be an enclosed space, such as a large warehouse storing electrical equipment or documents. Conduit 3 will be mounted near to the ceiling of the volume 2, and may comprise a plurality of connected pipes—for example, an array of pipes mounted on the ceiling or extending around the periphery of the ceiling. FIG. 1 shows one such pipe, comprising respective tubular pipe parts 4A,4B and 4C. Opposite ends of pipe parts 4A and 4B are coupled together by pipe coupling 5A. Pipe parts 4B and 4C are coupled together by coupling part 5B. The coupling parts 5A,5B each include an inlet 6A,6B which extends generally perpendicular to the longitudinal axis of the conduit 3. A sampling nozzle 7A,7B is fitted to each inlet and includes an orifice 8A,8B which allows the passage of air, and any smoke particles, present in the volume 2 to pass from the volume 2 into the inlets 6A,6B, and from there along the conduit 3 to the smoke detector 1. A fan (not shown) may be provided for causing the flow of air, and any smoke particles, from the inlets 6A,6B along the conduit 3 towards the smoke detector 1.

FIG. 1A shows a plan view of the sampling nozzle 7B (the sampling nozzle 7A would have a similar configuration). The orifice 8B is circular, although it could have a different shape.

The sampling nozzles 7A,7B are coupled to the respective inlet 6A,6B in a generally fluid-tight manner. The coupling parts 5A,5B are connected to the pipe parts 4A,4B,4C also in a generally fluid-tight manner. For example, these elements could have an interference fit with one another.

As will be understood by those skilled in the art, the smoke detection system shown in FIG. 1 of generally known type may be highly sensitive to small quantities of smoke particles in the atmosphere of the volume 2, and can provide very early detection of a fire. However, a disadvantage of the system shown is that the location of the source of smoke particles (and therefore the likely source of the fire) within the volume 2 cannot be determined. It will be appreciated that, if the volume is large, it may take considerable time to perform a manual search of the volume to locate the source of the smoke particles.

Figure 2:
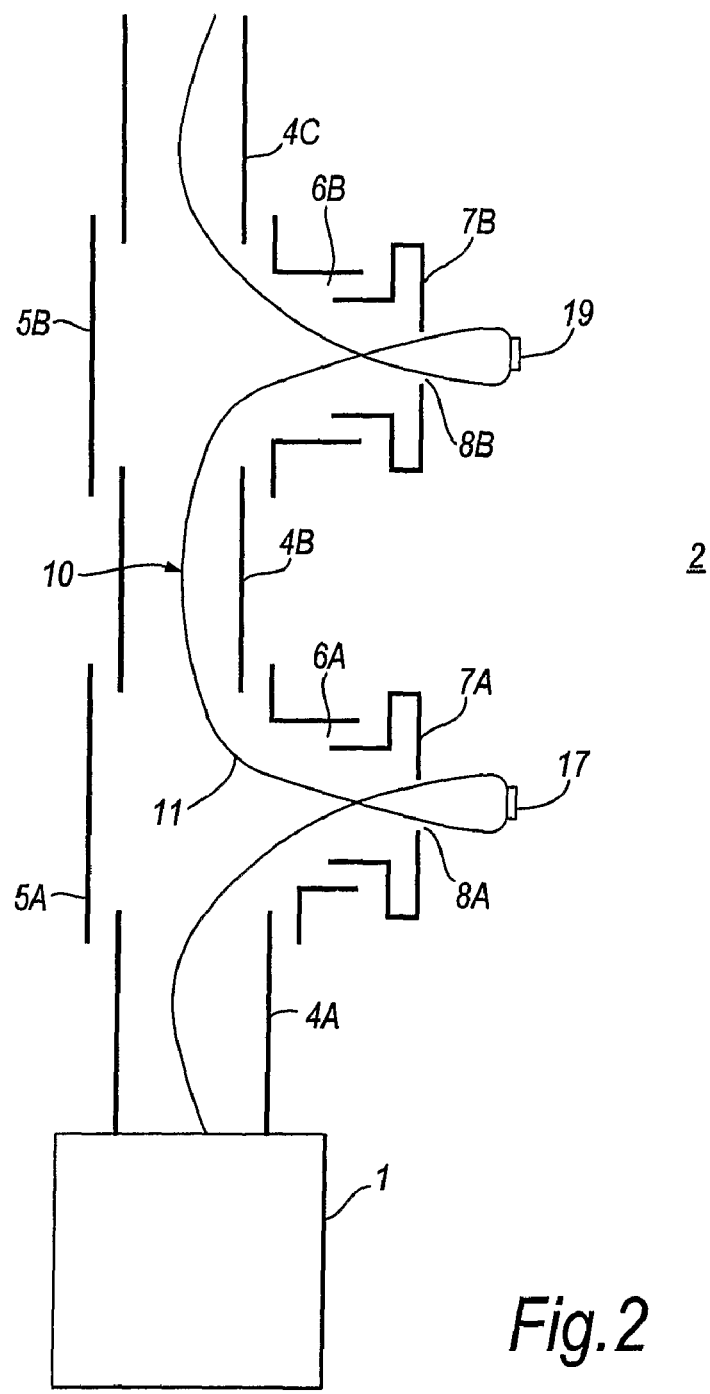
FIG. 2 shows the smoke detection system of FIG. 1 modified in accordance with the invention.

FIG. 2 shows a fire detection system, including the smoke detection system of claim 1 but modified to include a fibre Bragg grating sensor 10. The fibre Bragg grating sensor 10 is shown schematically in more detail in FIG. 3, and comprises a single fibre optic cable 11 with a plurality of fibre Bragg gratings 17,19,21,23,25 and 27 formed thereon (only gratings 17 and 19 being shown in FIG. 2).

The fibre optic cable 11 comprising the fibre Bragg grating sensor 10 passes along the inside of the conduit 3 and is configured or manipulated to extend out of each sampling nozzle orifice 8A,8B along the length of the conduit 3. In FIG. 2, the fibre optic cable 11 is shown as forming a loop in the region of the sampling nozzle orifices 8A,8B, and then extending generally linearly along the conduit 3 between adjacent sampling nozzles 7A,7B. Other configurations of fibre optic cable 11 could of course be used.

The fibre Bragg gratings are formed along the fibre optic cable 11 at spaced apart intervals such that a fibre Bragg grating is formed in the part of the fibre optic cable 11 that extends from the sampling nozzle orifices 8A,8B into the volume 2.

Figure 3:
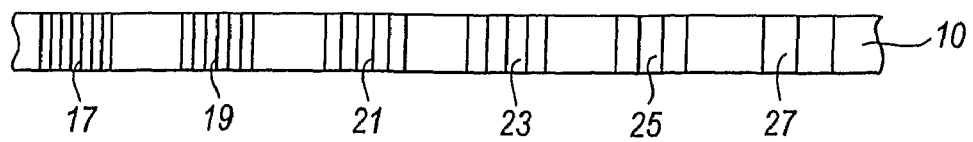
FIG. 3 shows a fibre Bragg grating sensor according to the present invention.

FIG. 3 shows that each of the fibre Bragg gratings 17 to 27 has a unique (different) grating period. In the sensor 10, the Bragg wavelength of the reflected light from each fibre Bragg grating 17 to 27 would be different due to the unique grating period of each fibre Bragg grating. If a spatial and/or temperature variation was to occur in the vicinity of, for example, fibre Bragg grating 17, the Bragg wavelength of the reflected light from fibre Bragg grating 17 would be shifted. This wavelength shift could be detected, and so the spatial and/or temperature variation can be sensed. As the Bragg wavelength corresponding to each fibre Bragg grating is unique (different), in this arrangement it is possible to associate the Bragg wavelength to the particular fibre Bragg grating 17, and hence the spatial and/or temperature variation can be located to the vicinity of fibre Bragg grating 17.

Preferably, the pitches of the gratings of the respective zones are chosen so that, at normal ambient temperature, the Bragg wavelengths are sufficiently widely spaced that over the operating range of the sensor the wavelength shift of the reflected light will never be sufficient for the reflected light to have a wavelength overlap with the wavelength of the light reflected from another zone.

Figure 4:
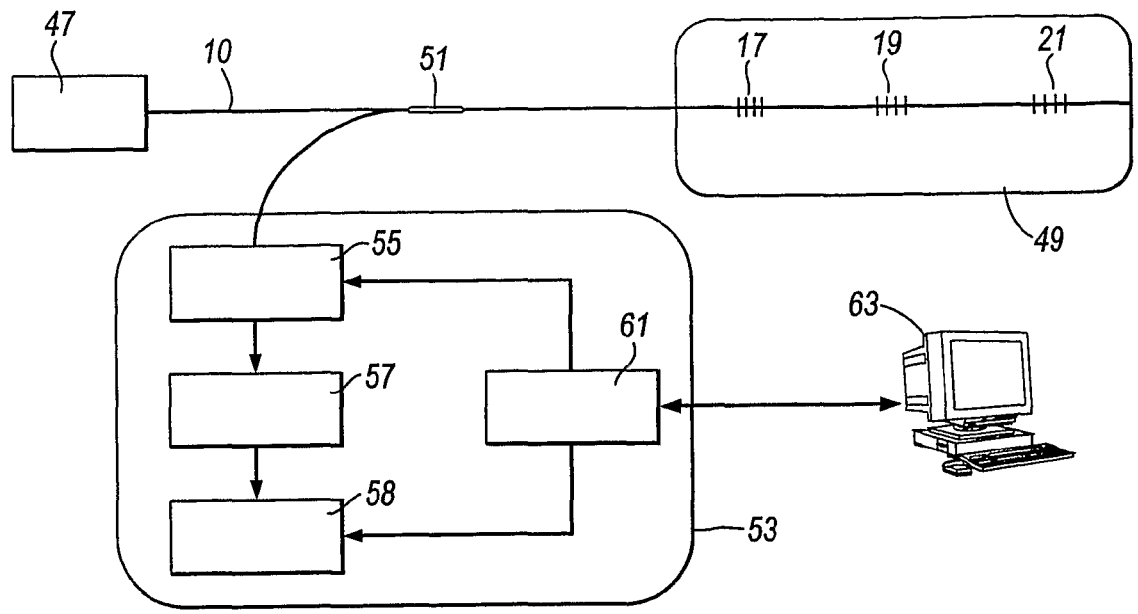
FIG. 4 shows a device for sensing spatial variations and/or temperature variations in the locality of a fibre optic cable using the fibre Bragg grating sensor according to the present invention.

FIG. 4 shows a device for sensing spatial variations and/or temperature variations in the locality of a fibre optic cable 11 using the fibre Bragg grating sensor as described in FIG. 3 and according to an aspect of the present invention. In this device, a broadband continuous light source 47 is used to shine incident light onto the fibre Bragg gratings arranged 17,19 and 21 shown in FIG. 3 (in FIG. 4 we assume that there are only three fibre Bragg gratings, for the sake of simplicity). Incident light from the broadband light source 47 is reflected by each of these fibre Bragg gratings, with the Bragg wavelength indicative of a particular fibre Bragg grating 17,19 or 21. The reflected light from each fibre Bragg grating 17,19,21 is returned back down the fibre optic cable 11 and redirected via a 2×1 coupler 51 to a wavelength detection system 53. This wavelength detection system 53 comprises a Fabry-Perot tunable filter 55, a photodetector 57, an amplifier 59 and a digital signal processing card 61. The wavelength detection system 53 allows analysis of the reflected light patterns which enables detection of the occurrence of a spatial and/or a temperature variation, with the location of the variation along the fibre optic cable 1 also detectable in terms of the particular fibre Bragg grating 17,19 or 21 in which the said variation has been sensed. The personal computer 63 provides a user interface for the wavelength detection system 53, thereby allowing a user to monitor the system remotely. The personal computer 63 also allows the user to control the scan such as by using a Fabry-Perot tunable filter 55, via the digital signal processing card 61. Other forms of monitoring of the Bragg grating wavelength may be used.

Although a broadband light source is used in FIG. 4, it should be understood that other forms of electromagnetic radiation may be used.

Figure 5A:
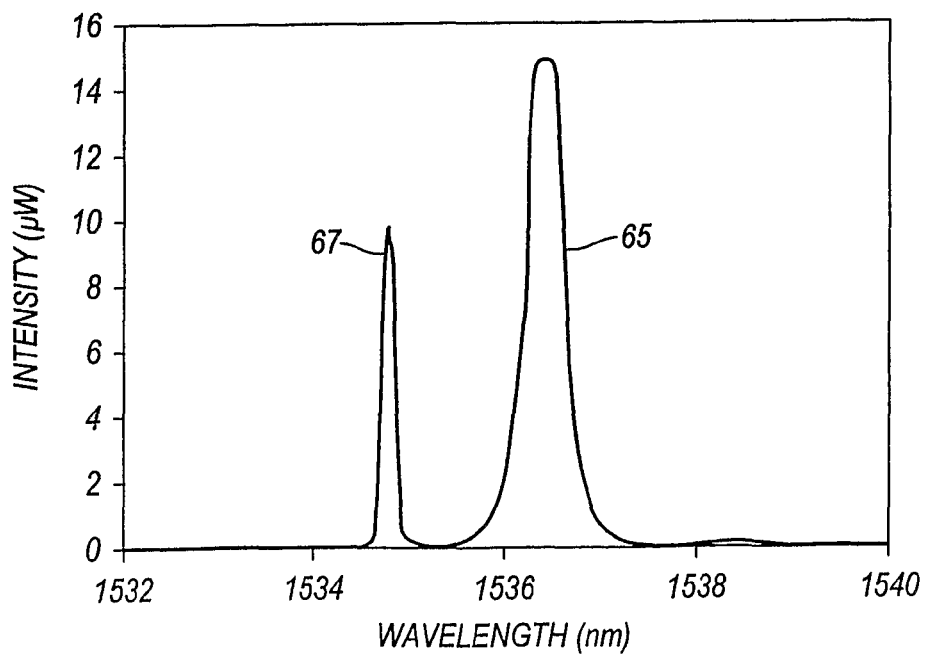
FIGS. 5 (a), (b) and (c) shows three images from the user interface of the device described by FIG. 4.

FIG. 5 shows three images taken from the personal computer 63 of a device as shown in FIG. 4. The images are plots of reflected light intensity against wavelength. In FIG. 5(a), the peak 65 corresponds to the unique Bragg wavelength of light reflected by fibre Bragg grating 17. The peak 67 results from a reference fibre Bragg grating (not shown in FIG. 4) maintained at a known temperature within the control electronics of the wavelength detection system 53. There may be more than one reference fibre Bragg grating, with each reference fibre Bragg grating having a different grating period. In this case, the plot as shown in FIG. 5(a) would have a plurality of reference peaks, one reference, peak resulting from each reference fibre Bragg grating and corresponding to the Bragg wavelength of the light reflected by that particular reference fibre Bragg grating.

Figure 5B:
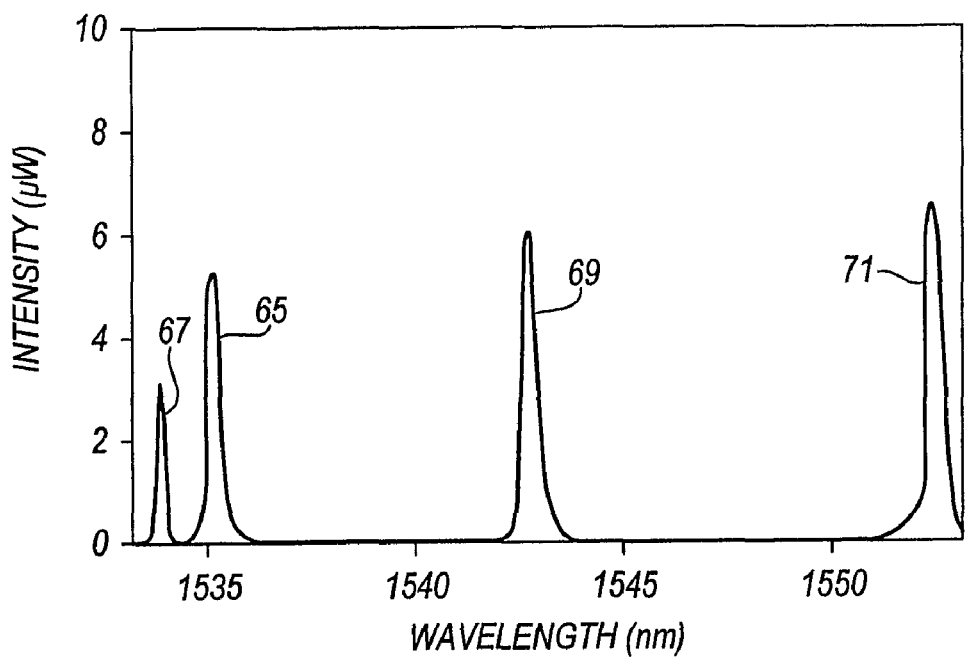

In FIG. 5(b), the three peaks 65, 69 and 71 correspond to the unique Bragg wavelengths of light reflected by respective fibre Bragg gratings 17,19 and 21. The respective fibre Bragg gratings each have a different grating period, leading to the reflection of light with a different Bragg wavelength from each which shows as three separate peaks 65, 69 and 71. The peak 67 corresponds to the reference fibre Bragg grating.

Because the reference fibre Bragg grating(s) are maintained at a constant known temperature and stress, the properties of the light reflected therefrom will be known. Therefore, any variations in the measured light reflected from a reference grating indicates that an error has occurred in the measuring device. For example, the measured light reflected from a reference grating can be used to correct drift in the wavelength-measuring Fabry-Perot grating 55 and its drive electronics.

Figure 5C:
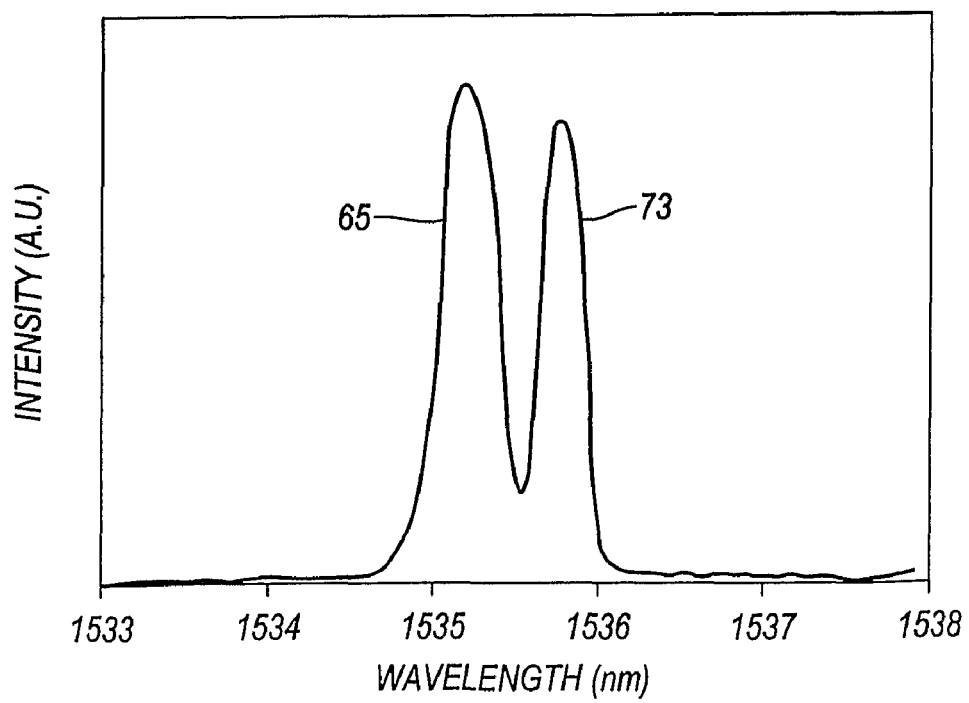

In FIG. 5(c), the peak corresponding to the Bragg wavelength of light reflected by fibre Bragg grating 17 is shown when a temperature change has occurred. The original peak is 65, the shifted wavelength resulting from the temperature variation causing a modified Bragg wavelength represented in FIG. 5(c) by the peak 73. It is therefore shown how a spatial and/or a temperature variation in the vicinity of one of the fibre Bragg gratings 17, 19 and 21 is detected by the device described by FIG. 4, and how such a variation is represented at the user interface on the personal computer 63.

In addition to representing the fibre Bragg grating that is subject to a temperature variation on the graphical user interface of the personal computer 63 (or as an alternative thereto), the fibre Bragg grating that is subject to a change of temperature could be detected automatically, and user intervention at an appropriate location within the volume 3 could be prompted.

It will be understood from the above discussion that the presence of the fibre Bragg grating sensor 10 within the conduit 3 of the smoke detector enables variations in temperature at any one of the nozzles 7A,7B to be detected, with the identity of the particular fibre Bragg grating which is subject to a change in temperature being identifiable. Therefore, the location of the source of the temperature rise can be determined (because the location of each fibre Bragg grating is known within the volume 2).

The presence of the fibre Bragg grating sensor 10, in addition to the smoke detector, makes the fire detecting arrangement of the present embodiment sensitive to both fires which generate initially or primarily mainly smoke particles, and also to fires which generate initially or primarily mainly heat. Of course, any fire (or potential fire) will typically generate some smoke particles and some heat. The fire detection system of the present invention detects the presence of smoke particles within the volume 2, and can also identify not only the presence of a temperature rise within the volume 2, but also the location of the temperature rise (because the locations of the fibre Bragg grating or gratings that are subject to a temperature variation is known). Therefore, the disadvantage of known smoke detection arrangements, which cannot provide any indication of the location of a source of smoke particles, or require highly complex mechanical arrangements to do this, is overcome by the provision of the fibre Bragg grating sensor 11.

Figure 6:
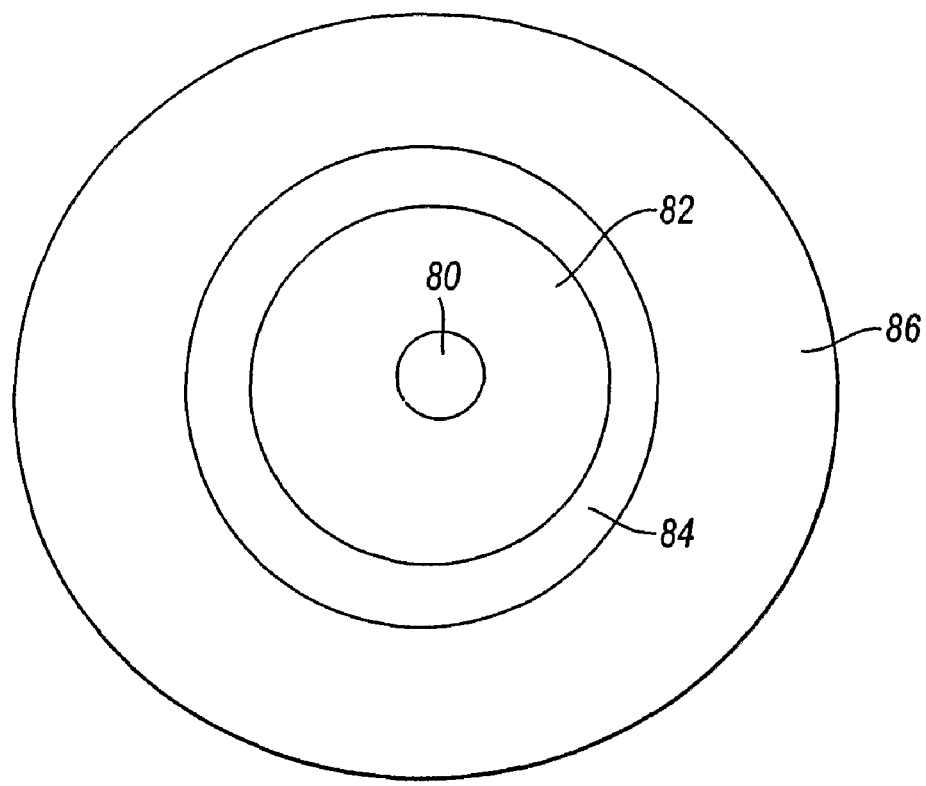
FIG. 6 shows a schematic cross-sectional view through a fibre optic cable.

FIG. 6 shows the cross-section taken through a typical fibre optic cable. The fibre optic cable includes a central core 80, typically formed of glass, which is surrounded by a cladding layer 82, also typically formed of glass. The core 80 will typically have a diameter of 0.1 millimeters. The cladding layer 82 is surrounded by an inner polymer coating 84, which is in turn surrounded by an outer polymer coating 86. The outer polymer coating 86 is thicker than the inner polymer coating 84, and may be formed from PVC or the like. Further outer coatings may be added, for example a metal braiding layer.

FIG. 6 shows a typical, general purpose fibre optic cable. Because, in the present embodiment, the fibre optic cable 11 is, for most of its length, protected by the conduit 3, the outer polymer layer 86 is unnecessary, and can be absent along the entire length of the fibre optic cable 11. This is advantageous compared with prior arrangements that use a fibre optic cable including fibre Bragg gratings to detect temperature variations. In those arrangements, where the fibre optic cable is not housed predominantly in a conduit, the outer polymer layer 86 is present, but must be removed in the region of the fibre Bragg grating to allow effective temperature measurement. This is an additional step in the manufacturing process of such a known fibre Bragg grating sensor. Advantageously, the embodiment of the present invention avoids this disadvantage.

In the embodiment shown in FIGS. 2 and 3, a single fibre Bragg grating is shown that is associated with each sampling nozzle 7A,7B. Each fibre Bragg grating is for detecting temperature variation. A plurality of fibre Bragg gratings may be provided in association with each sampling nozzle 7A,7B for measuring temperature variation.

Figure 7:
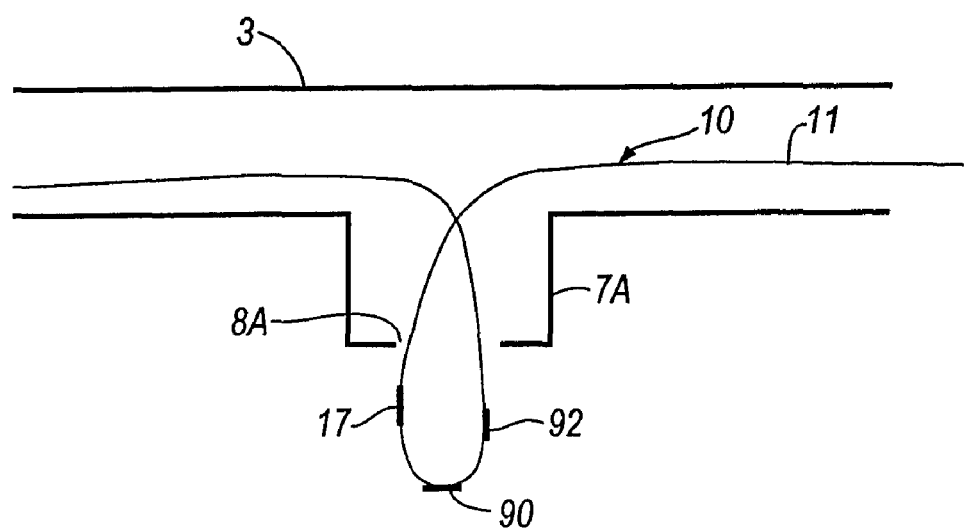
FIG. 7 shows a schematic cross-sectional view of a smoke detection system including a modified fibre Bragg grating sensor in accordance with the present invention.
Figure 8A:
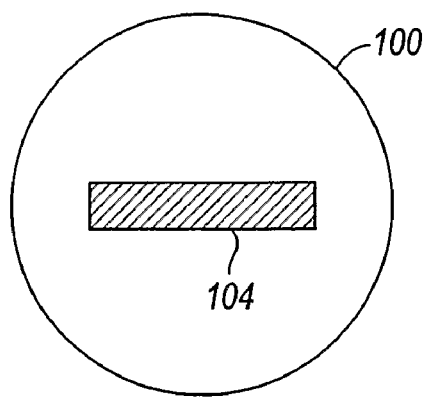
FIGS. 8 (a),(b),(c) and (d) show a modified sampling nozzle in accordance with an embodiment of the invention.
Figure 8B:
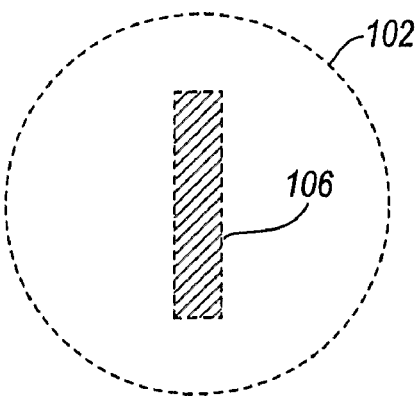
Figure 8C:
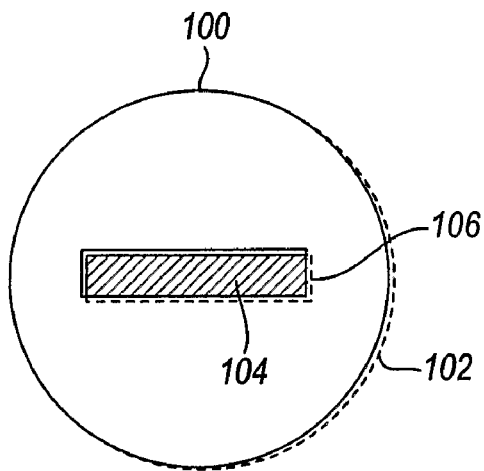
Figure 8D:
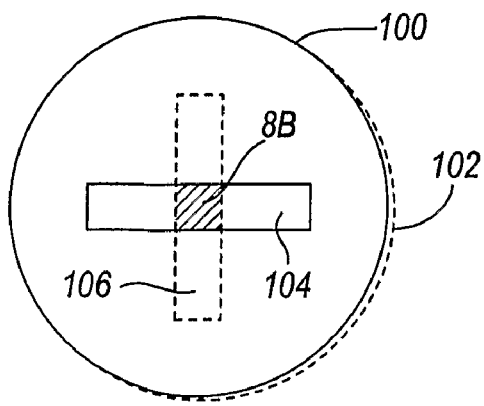

In accordance with FIG. 7, respective fibre Bragg gratings may be provided in association with one sampling nozzle 7A. In this embodiment, a first fibre Bragg grating may correspond to the temperature sensing fibre Bragg grating 17 shown in FIGS. 2 and 3. A second 90 and third 92 fibre Bragg grating could be provided which are sensitive to respective types of gas. Such gas-sensitive fibre Bragg grating sensors will have in the region of the respective grating 90,92 the inner polymer coating 84 removed and replaced with an alternative coating applied which reacts with the gas to be detected and which causes a spatial variation in the region of the fibre Bragg grating 90,92 in response to the presence of the relevant gas. This spatial variation can be detected in the manner as the spatial variation of fibre Bragg grating 17 (in response to temperature changes) is detected. However, the spatial variation of the fibre Bragg gratings 90,92 will be indicative (primarily) of the presence of a selected gas, rather than a variation in temperature. Each of the fibre Bragg gratings 17,90 and 92 (and all the other fibre Bragg gratings of the fibre optic cable 11) will preferably have a different pitch such that the detection system 53 can identify which of the respective fibre Bragg gratings has a wavelength shift.

In addition to responding to the selected gas, the fibre Bragg grating with the gas sensitive coating will also respond to temperature changes. Preferably, the fibre Bragg grating is designed to maximise the gas response with respect to the temperature response. However, it is advantageous to correct for the temperature response with a reference fibre Bragg grating sensor which does not have the gas sensitive coating. This may be a special sensor matched to the gas sensing fibre Bragg grating or a temperature sensor which would be present in any case may be used.

For detection of a response from of a single gas sensitive fibre Bragg grating, both the temperature sensor and gas detector could operate at the same wavelength, with the temperature indicated by the absolute wavelength of the reflection and the gas concentration indicated by the wavelength difference.

FIG. 8 shows a modified form of sampling nozzle 7B, which may facilitate threading of the loop of the fibre optic cable 11 therethrough. The modified sampling nozzle comprises two circular plates 100,102, having respective rectangular slots 104,106 formed therein. The second circular plate 102 and the rectangular slot 106 thereof are shown by dashed lines in FIG. 8, to assist in distinguishing between them. FIG. 8 (*a*) shows the first circular plate 100, and FIG. 8 (*b*) shows the second circular plate 102. In use, the circular plates 100 and 102 are positioned one over the other so that their central axes are aligned (and also their circumferences are aligned if they are of the same circumference). This arrangement of the circular plates 100,102 is shown generally in FIGS. 8 (*c*) and (*d*), although some misalignment of the central axes/circumferences is shown in the Figure for diagrammatic clarity.

The circular plates 100,102 are mounted so that one is rotatable with respect to the other about their common central axis.

Conveniently, the circular plates 100,102 are subject to relative rotation so that the slots 104,106 are aligned, as shown in FIG. 8 (*c*) when it is desired to pass or thread the fibre optic cable 11 through the sampling nozzle, to allow the fibre optic cable to pass from the conduit 3 into the volume 2. When the fibre optic cable 11 has been passed or threaded through the slots 104,106, so that it extends into the volume 2—for example in the looped configuration shown in FIG. 2—one of the circular plates 100,102 is rotated through 90°, so that the slots 104,106 lie perpendicularly to one another, as shown in FIG. 8(*d*). This results in there being a relatively small (compared to the size of the slots 104,106) orifice 8B formed in the sampling nozzle 7B and extending through both the circular plates 100,102. The size and arrangement of the slots 104,106 is selected so that the orifice 8B formed by them is of an appropriate size to allow effective operation of the smoke detector 1. The formation of the relatively small orifice 8B also helps maintain the fibre optic cable 11 in position. Any or all of the nozzles in the conduit may have the configuration shown in FIG. 8.

As an alternative to each of the respective fibre Bragg gratings having a different grating pitch/period, all or a plurality of the fibre Bragg gratings could have the same pitch/period. In such a sensor, the Bragg wavelength of the reflected light from some of or all of the fibre Bragg gratings would be the same due to the identical grating period of each fibre Bragg grating. If a spatial and/or temperature variation was to occur in the vicinity of a particular fibre Bragg grating, the Bragg wavelength of the reflected light from that fibre Bragg grating would be shifted because the distance between adjacent elements of the grating is altered. This wavelength shift could be detected, and so the spatial and/or temperature variation can be sensed. A problem with this arrangement is that the Bragg wavelength of the reflected light from each fibre Bragg grating is the same, and so there is no provision for assigning the shift in the Bragg wavelength to the particular fibre Bragg grating responsible for the shift, and so precise location of the spatial and/or temperature cannot be determined or can only be obtained very approximately—for example by optical time domain reflectometry.

Typically a single fibre Bragg grating is approximately 4 millimeters in length. The conduit 3 may, for example, be 100 meters in length and may have between 20 and 30 fluid inlets and associated sampling nozzles. Such an arrangement would require 20 to 30 fibre Bragg gratings (assuming that one fibre Bragg grating was associated with each inlet). Preferably, all the fibre Bragg gratings are formed in a single fibre optic cable. It is expected that such a system would be sensitive to temperature variations of approximately 50° C.

In the smoke detector system of FIG. 1, some of the sampling nozzles 7A,7B may be provided with different sized holes or orifices 8A,8B (with a typical size of perhaps 5 millimeters). For example, inlet orifices furthest from the smoke detector 1 may be larger, to compensate for the reduced flow from the distant nozzle, and to make the smoke detector 1 equally sensitive to smoke particles present at a distant orifice.

The fibre Bragg grating sensor 10 of the embodiments will not have a significant effect on the flow of fluid into the sampling nozzles because of its small diameter (particularly as the outer polymer coating 86 is not present). For the same reason, the fibre Bragg grating sensor 10 would have minimal visual impact of the complete detection system—the fibre optic cable 10 being barely visible where it exits from each nozzle orifice.

The fibre optic cable used in the embodiments will be photosensitive to allow the creation of Bragg gratings along its length. Preferably, the photosensitive fibre optic cable 11 comprises either a germanium doped fibre, a boron-germanium co-doped fibre or an antimony-erbium-germanium co-doped fibre but is not limited to the use of such dopants to create the photosensitivity of the fibre.

The invention claimed is:

1. A fire detection system for monitoring a volume containing a fluid, the system comprising:
   a smoke detector;
   a conduit having a plurality of spaced inlets for receiving the fluid from the volume being monitored and for directing the received fluid, and any smoke particles therein, to the smoke detector;
   a cable extending through the conduit and having a portion extending out of each inlet into the volume being monitored; and
   a plurality of sensors responsive to a sensed condition indicative of presence of fire, each sensor being positioned within the volume being monitored by one of the portions of the cable extending out of the inlets into the volume being monitored, each sensor providing a signal that is based upon the sensed condition and that identifies a location of the sensor.

2. The system of claim 1 and further comprising:
   a detector for receiving the signals from the sensors and for providing an indication of a location where a fire is present.

3. The system of claim 1, wherein the sensors each comprise at least one fibre Bragg grating.

4. The system of claim 3, wherein the cable comprises a fibre optic cable and the fibre Bragg gratings are formed in the fibre optic cable.

5. The system of claim 4, wherein the fibre optic cable includes a central core and a cladding layer for providing the desired optical properties, and a single protective coating over at least the majority of the cladding layer.

6. The system of claim 5, wherein the single protective coating is formed over the entire cladding layer.

7. The system of claim 3, wherein the fibre Bragg gratings are primarily responsive to temperature change.

8. The system of claim 3, wherein the fibre Bragg gratings are primarily responsive to the presence of a predetermined gas.

9. The system of claim 3, wherein the respective fibre Bragg gratings each have a different period.

10. The system of claim 4, wherein the portion of the fibre optic cable that extends out of each inlet is a loop.

11. The system of claim 1, wherein at least one of the inlets includes a nozzle with a smoke particle-receiving orifice formed therein.

12. The system of claim 11, wherein the nozzle includes first and second plates having respective elongate slots formed therein, the plates being arranged for relative movement therebetween to form the orifice from the slots.

13. The system of claim 12, wherein the plates are mounted for relative rotation therebetween.

14. A fire detection system for monitoring a volume containing a fluid, the system comprising:
    a smoke detector;
    a conduit having a plurality of spaced inlets for receiving the fluid, and smoke particles therein, from different spaced locations of the volume and directing the fluid and smoke particles to the smoke detector; and
    a fibre optic cable extending through the conduit and including a plurality of loops and a plurality of Bragg grating sensors, each loop extending out of a respective on of the inlets to position at least one of the Bragg grating sensors within the volume near the respective inlet, the Bragg grating sensors being responsive to temperature or presence of a predetermined gas and producing optical signals that identify changes in temperature or the presence of the predetermined gas and the location at which the changes occur.

15. The system of claim 14 and further comprising:
    a detector for receiving the optical signals from the Bragg grating sensor and for providing an indication of the location and/or identity of any Bragg grating sensor that is subject to expansion or contraction.

16. The system of claim 14, wherein the fibre Bragg grating sensors are formed in the fibre optic cable.

17. The system of claim 16, wherein the fibre optic cable includes a central core and a cladding layer for providing the desired optical properties, and a single protective coating over at least the majority of the cladding layer.

18. The system of claim 17, wherein the single protective coating is formed over the entire cladding layer.

19. The system of claim 14, wherein the Bragg grating sensors each have a different period.

20. The system of claim 14, wherein at least one of the inlets includes a nozzle with a smoke particle-receiving orifice formed therein.

21. The system of claim 20, wherein the nozzle includes first and second plates having respective elongate slots formed therein, the plates being arranged for relative movement therebetween to form the orifice from the slots.

22. The system of claim 21, wherein the plates are mounted for relative rotation therebetween.

23. A fire detection method comprising:
    receiving fluid at a plurality of spaced inlets that communicate with a volume being monitored;
    directing the received fluid, and any smoke particles therein, through a conduit to a smoke detector;

producing a smoke detector output based upon the smoke particles received by the smoke detector from the conduit;

sensing with Bragg grating sensors positioned in the volume adjacent each of the inlets, a change in temperature or presence of a predetermined gas indicative of a fire condition; and transmitting optical signals from the Bragg grating sensors through a fibre optic cable to a detector that identifies presence of a fire condition sensed by one of the Bragg grating sensors and a location of the fire condition based on location of the Bragg grating sensor that sensed the fire condition.

24. The method of claim 23, wherein at least one of the Bragg grating sensors senses a change in temperature.

25. The method of claim 23, wherein at least one of the Bragg grating sensors senses the presence of a predetermined gas.

26. The method of claim 23, wherein the Bragg grating sensors each have a different period.

27. The method of claim 23, wherein the fibre Bragg grating sensors are formed in the fibre optic cable.

28. The method of claim 27, wherein the fibre optic cable extends along the conduit and is arranged to extend from each inlet into the volume.

29. The method of claim 28, wherein the fibre optic cable is looped in the region of each inlet.

* * * * *